2,158,664

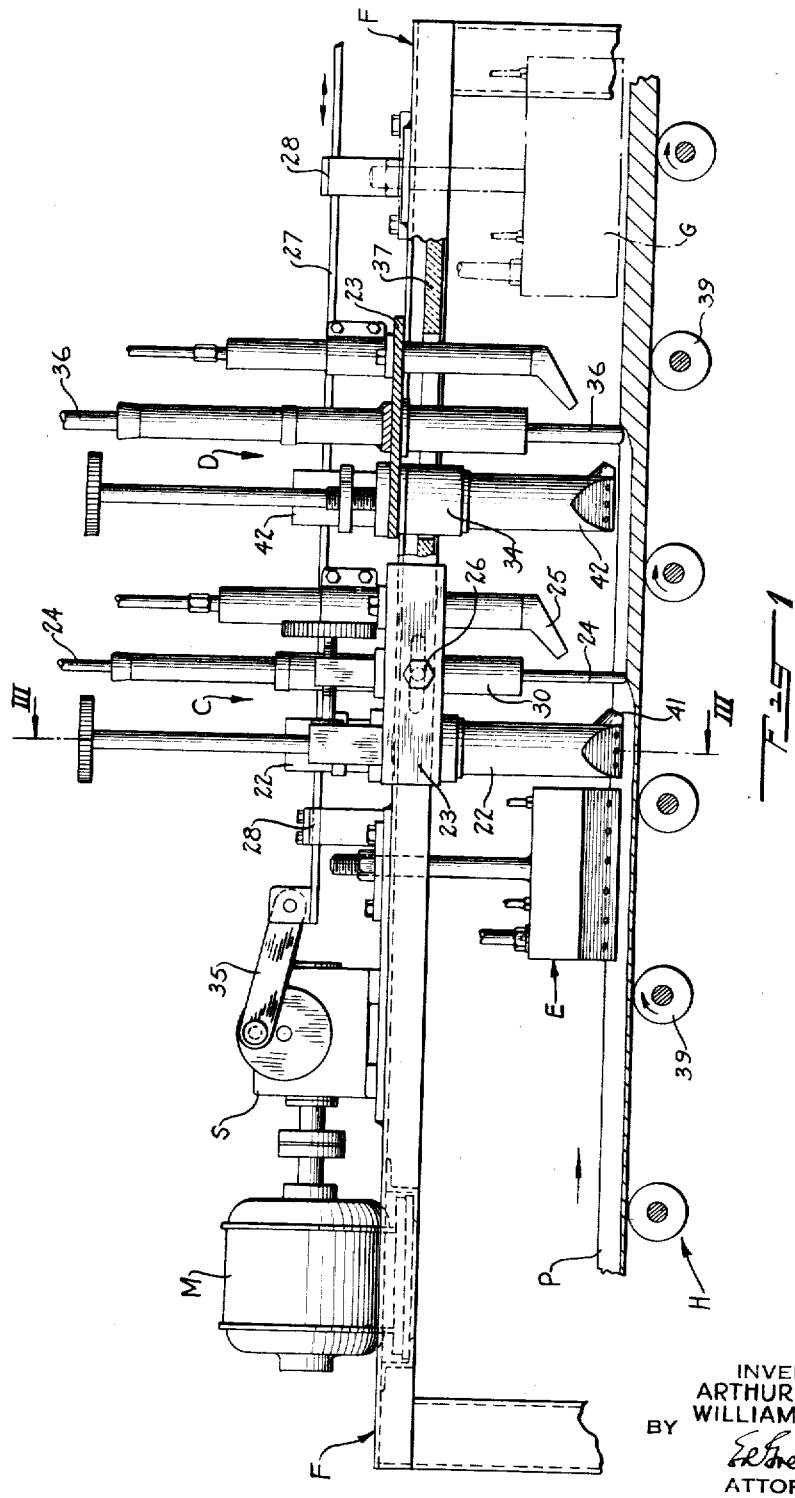

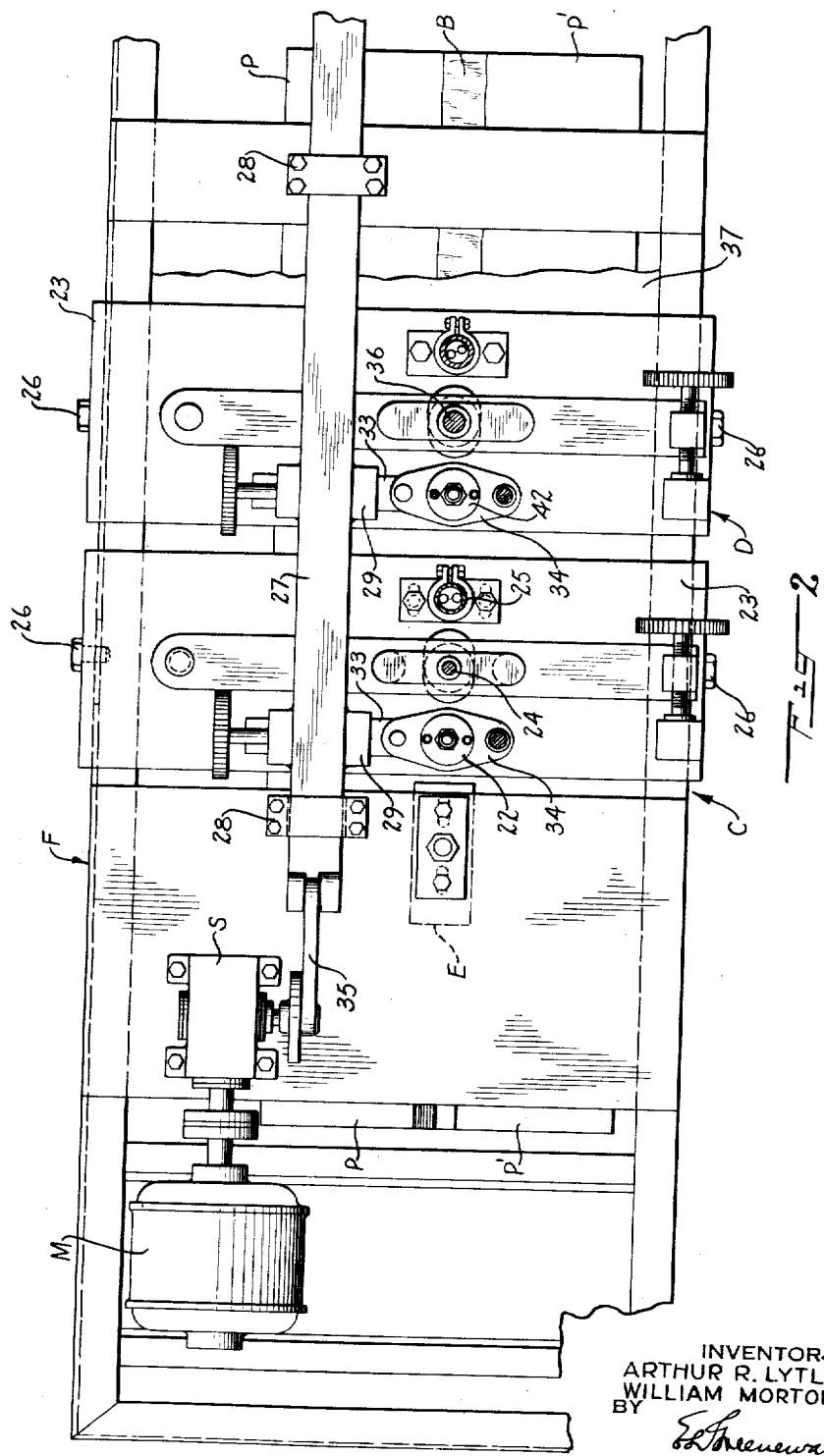

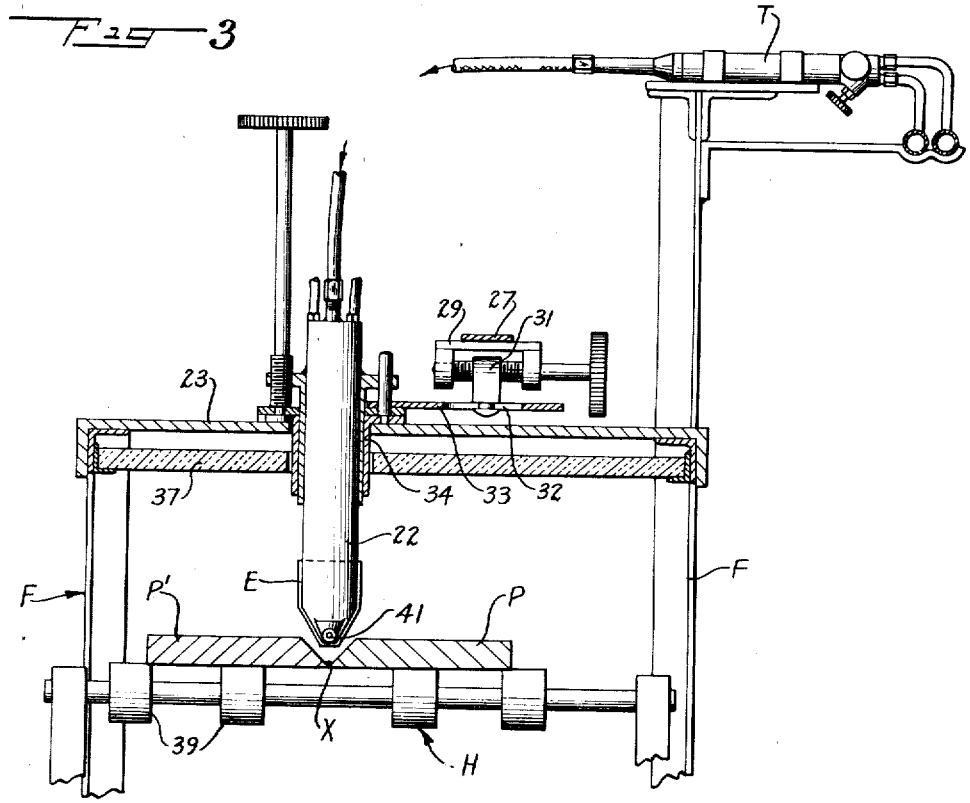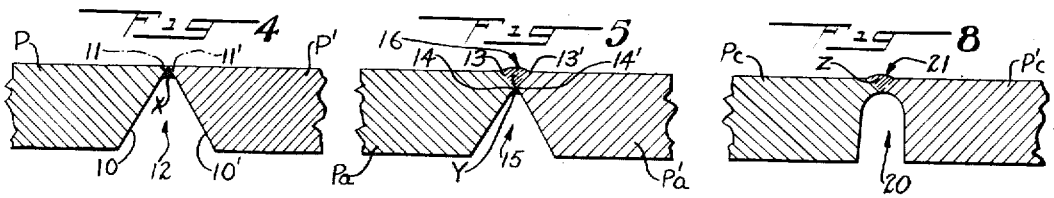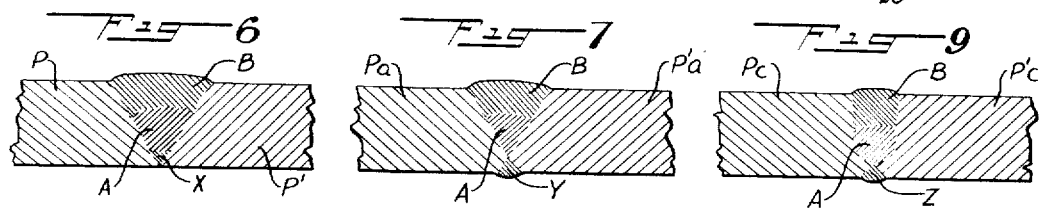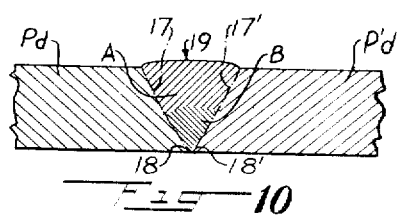
INVENTORS
ARTHUR R. LYTLE
WILLIAM MORTON
BY
ATTORNEY Patented May 16, 1939

UNITED STATES PATENT OFFICE 2,158,664

WELDING PROCESS AND APPARATUS

Arthur R. Lytle and William Morton, Niagara Falls, N. Y., assignors, by mesne assignments, to Union Carbide and Carbon Corporation, a corporation of New York Application April 23, 1935, Serial No. 17,838

16 Claims. (Cl. 113—59)

This invention relates to welding and more particularly to processes and machines employing oxy-fuel-gas flames for producing welded joints, especially those uniting comparatively thick metal plates.

In the gas welding of both light and heavy steel plates, it is necessary to obtain a balance between a number of factors, such as the thickness of the plates, the size of the welding rod, the heating capacity of the welding torch, and the speed of welding, in order to economically produce uniform welds of good quality. For example, the heat input into the plate and the welding rod must be balanced with the heat capacity of the plate and the rod; otherwise, if the heat input is too high, overheating and burning will occur, and if the heat input is too low, the welding will be uneconomically slow and probably of poor quality. In producing welded joints between plates having a thickness up to about one-half inch, this balance is readily obtainable by a proper selection from standard welding flame and welding rod sizes and by easy manipulation of the appropriate welding rod and flame-producing torch by the operator.

However, for gas-welding plates having a thickness of more than about three-fourths inch, the welding flame and welding rod, when properly proportioned to the plate thickness, become so unwieldy and heavy that their use by an operator is impracticable. On the other hand, the welding flames and welding rods suitable for comfortable manipulation by an operator are too small for heavy-plate welding; and the speed and cost of gas-welding such relatively thick plates with such equipment and procedure, as well as the quality of the resulting welds, compare unfavorably with the quality, speed, and cost of light-plate gas-welding.

Accordingly, the principal objects of this invention are: to provide an improved welding process and apparatus which shall overcome the difficulties encountered in prior welding operations, especially in butt welding relatively thick metal plates by means of high-temperature gas flames; to provide a welding process and apparatus which shall produce, in a single pass, a multiple-layer weld of high quality between contiguous surfaces of relatively thick metal plates; to provide a welding procedure adapted to effectively and conveniently produce a high-quality weld that is continuous for the full thickness of the plates being united; and to provide a procedure and apparatus for economically and concurrently depositing superposed layers of weld metal, normalizing the same, and refining the grains thereof, to produce a resulting unitary thick weld of high quality. These objects and others and the novel features of the invention will become apparent in the following description and the accompanying drawings, in which:

Figs. 1 and 2 are, respectively, a side view and a plan view of a welding apparatus embodying this invention and adapted to perform the improved welding process;

Fig. 3 is a sectional view taken on the line III—III of Fig. 1; and

Figs. 4, 5, 6, 7, 8, 9, and 10 are views which diagrammatically illustrate various welded joints and the procedures of making them in accord with the principles of this invention.

Generally speaking, the principles of this invention are most advantageously applied in butt welding thick metal plates by means of high-temperature gas flames, such as oxy-acetylene flames, and filler metal which may be applied by melting suitable metal welding rods. A groove or scarf, of any suitable or preferred shape to receive such filler metal, may be provided in a well known manner between the contiguous or opposed edges of the thick plates to be welded. According to this invention, plates upwards of about three-fourths inch in thickness are welded by concurrently depositing a sufficient number of superposed layers of weld metal in tandem fashion to completely fill the groove during a single pass of the welding mechanism lengthwise of the groove. This mechanism may consist of a number of welding units corresponding to the number of layers of weld metal to be deposited, followed by a unit comprising one or more heating flames to normalize at least the last-deposited layer and to refine its grains. The first welding unit preferably consists of one or more high-temperature preheating flames of sufficient heating capacity to preheat the plate metal and the surfaces of the groove ahead of the welding point; means to guide or feed the filler metal or welding rod to the welding point, with or without flames to preheat such filler metal or rod; and one or more high-temperature welding flames applied to the welding point and to the lower end of the rod to melt the latter and the adjoining surfaces of the grooves. The first or bottom layer is thus deposited by this unit, and the second and succeeding layers may be similarly deposited at short intervals as the welding groove is progressively presented to the second and succeeding welding units, each layer of weld metal being deposited almost immediately after the preceding layer and at a short distance behind the point at which the previously-deposited layer has partially or completely solidified, say about three or four inches, depending upon the welding speed. Since the welded layer and the adjoining plate metal which are presented to the second and succeeding welding units are already at a high temperature, it usually is unnecessary to use auxiliary plate-preheating flames with the welding units after the first one, and an additional economy in gas consumption and equipment is thus attained. During the progress of the welding, the welding flames are preferably moved or oscillated back and forth across the groove and the deposited metal to assist in a uniform delivery of heat to these parts and to control the contour and surface of the solidified weld metal. Either or all of the plate preheating flames and the rod preheating flames, as well as the welding rods, may be similarly oscillated. As a further aid in obtaining good fusion and penetration, it is desirable to employ oxy-acetylene flames containing a slight excess of acetylene. Since the welding usually proceeds at a uniform speed along the groove, particularly in an automatic welding machine, the diameters or sizes of the successive welding rods desirably are progressively larger than the one at the first welding unit, due to the greater width of the layer and the greater amount of filler metal that must be deposited within a given time; and the amplitudes of the several flame and rod movements are progressively increased to cover the increased width of the weld. Two or more small welding rods, of suitable size, either with or without accompanying rod-preheating flames, may be used instead of a single large welding rod.

The single pass procedure of multiple-layer welding just described has decided advantages over prior welding practices since here there is a lessened susceptibility to oxidation due to the relatively small pool of molten metal exposed to the air; a better control over the molten metal pool is afforded; and the physical properties of the entire weld are improved by the reheating of the layers during the deposition of the succeeding layers. The heat applied in welding each layer after the first may be used in part to normalize the previously deposited metal, except the last layer. The units which deposit the second and succeeding layers may be so located and the operation so timed that the previously-deposited metal, when it reaches the next welding unit for the deposition of another layer, will have cooled to a temperature just below the lower critical point for steel, whereupon normalizing and grain refinement of the preceding layer will occur. It will be understood, however, that if the welding units are located and/or the speed adjusted so that a second layer will be deposited after the first layer is in a solid or semi-solid condition but before it cools below the critical temperature, there will be no such grain refining action; the resultant weld will have a uniform grain structure throughout its entire depth; and the process may be carried out with greater speed and economy. The normalization and grain refinement of the final layer or the entire weld may be effected by a heat-treating oxy-acetylene or other high-temperature flame which follows the welding unit that deposits the final layer. This heat-treating flame is applied to the weld after it has cooled below the lower critical temperature for steel, and is maintained at the proper temperature and for the length of time necessary to provide the desired composition of weld metal. These normalizing and grain refining treatments probably would not be used for alloys which have no transformation points.

It is important that the weld shall be continuous for the full thickness of the plates. Preliminary to the procedure described above, the reverse side of the entire seam is preferably (but not necessarily) first welded to provide perfect fusion for the bottom of the complete weld; to provide a trough with a constant cross sectional area in which the first layer of the main weld may be deposited; and to securely tack the plates in abutting relation, thus obviating special tacking or mechanical spacing means. Consistency of cross sectional area and freedom from irregularities along the welding groove are very important, especially for satisfactory automatic welding operations. Such preliminary union of the plates may be effected by directly welding together the abutting portions of the edges of the scarfed plates, either with or without the addition of weld metal; as, for example, by directly welding together the sharp abutting corners of the two plates, each of which has a plain bevelled edge cooperating with the opposed edge to form a single V-groove between them. A better preliminary union for most purposes may be effected by machining or otherwise shaping each plate edge so that an unbalanced double V-shaped or double U-shaped groove is produced when these plates are assembled edge to edge; so that a very small and shallow groove will extend along one side of the seam to receive the preliminary weld metal, and a much larger and deeper groove will extend along the opposite side of the seam to receive the main multiple-layer weld when the preliminary weld has been completed. The depth of the small groove preferably is less than one-fourth the thickness of the plates and its width is proportionally narrower than the larger groove. In both types of preliminary welding, the total thickness of the weld will not exceed about one-fourth of an inch and usually will be one-eighth of an inch or less, so that these preliminary welds can be made either manually or automatically at a high rate of speed and either by gas welding or electric welding.

Figs. 4, 5, 6, 7, 8, 9, and 10 of the drawings diagrammatically illustrate the optional and alternative preliminary welding operations described in the next preceding paragraph above, and which may be performed preparatory to the main single pass multiple-layer welding operation previously described. As shown in Fig. 4, the thick steel plates P, P' may be provided with plain bevelled edges 10, 10' and assembled in substantially abutting relation along their sharp ridges or corners 11, 11' to provide a single V-shaped welding groove 12. The ridges 11, 11' may then be welded together electrically or by a high temperature gas flame, as indicated at X, to unite the plates and close the bottom of the groove 12 throughout its entire length. As shown in Fig. 5, plates Pa, P'a may be provided with double-bevelled edges 13, 13' and assembled in abutting relation along the ridges or corners 14, 14' to provide an unbalanced double V-shaped groove consisting of a large (deep and wide) groove 15 and a small (shallow and narrow) groove 16. The plates Pa, P'a may be united and the bottom of the groove 15 closed throughout its length by a continuous deposit of weld metal Y filling the groove 16 and extending slightly and substantially evenly into the bottom of the groove 15. It is obvious that the grooves formed in the plates may take any desired shape. As shown in Fig. 8 the groove may consist of a large U-shaped trough 20, and a small V or U-shaped groove 21, extending respectively from opposite sides of the plates Pc and P'c at the juncture line. Weld material Z may be added in any convenient manner to the small upper groove 21 throughout its length as a primary operation, to unit the plates and to provide complete fusion of the scarfs on the side of the plates opposite that in which the large U-shaped groove is formed.

The steel plates, united as shown in Figs. 4, 5, or 8, may then be turned over to present the grooves 12, 15, or 20 to receive the single pass multiple-layer weld A, B, as shown in Figs. 6, 7, and 9, respectively. The first layer A is welded directly to the weld X in Fig. 6, to the weld Y in Fig. 7 or to the weld Z in Fig. 9; this together with the succeeding layer B or additional layers fused with it, assures a continuous weld for the full thickness of the plates. However, such preliminary welding may be omitted; and, as shown in Fig. 10, steel plates Pd, P'd may be provided with similarly scarfed edges, such as the bevelled edges 17, 17', and assembled in abutting or contiguous relation along their sharp corners or ridges 18, 18', to provide a suitable welding groove, such as the single V-shaped groove 19. With the plates Pd, P'd disposed in a substantially horizontal position and the groove 19 facing upwardly, the weld metal layers A, B may be simultaneously and successively deposited in and along this groove during a single pass of the plates relatively to the welding means, thereby producing a continuous weld for the full thickness of the plates.

In general, the processes of welding the several plates by depositing the main multiple-layer weld metal in grooves 12, 15, 19, or 20 are identical. A typical welding apparatus for carrying out this process is shown in the drawings to more clearly disclose, but not to limit the scope of, the invention. For convenience and clarity, the invention is herein disclosed as applied to the welding of plates of a thickness requiring only two layers of weld metal to produce a complete main weld, but it will be evident that more than two layers may be similarly deposited where the condition or plate thickness demands more layers.

Referring to Figs. 1, 2, and 3, the welding apparatus comprises a suitable metal frame F for supporting the two welding units C and D, the preheating unit E, and the heating treating unit G, as well as associated equipment, all above a suitable feeding mechanism H. The mechanism H is shown diagrammatically as a plurality of rollers, to some of which rotary motion is imparted so that the steel plates may be fed at a uniform rate of speed through the apparatus with the welding groove in proper operative position relative to the aligned heating and welding units C, D, E, and G. It will be evident that the relative movement of the plates and the welding apparatus may also be achieved by placing the plates on a stationary support and moving the welding apparatus along and in operative relation to the plates and the welding groove therebetween.

The preheating unit E depends from the frame F and is carried by means permitting adjustment of its position with respect to the first welding unit C and to the groove in the work. The welding unit C comprises a welding blowpipe 22 adjustably supported by a mounting plate 23 so that the position of the blowpipe 22 may be adjusted longitudinally and vertically. Closely associated with the blowpipe 22 is a welding rod guide 30 adjustable with respect to the blowpipe. A metal weld rod 24 slides within the weld rod guide 30 and may be fed to the groove, either mechanically or by gravity. A weld rod preheating blowpipe 25, adapted to direct a heating flame against the lower portion of the rod 24, is adjustably secured to the mounting plate 23. The welding blowpipe 22, the welding rod guide 30, and the weld rod preheating blowpipe 25 are preferably all mounted so that the position of each may be adjusted with respect to one another, and the position of the entire unit is preferably movable with respect to the frame F by means of an adjustment device such as, for instance, a slot cut in the side of the frame F together with a fastening means 26 extending through the mounting plate 23.

Means is provided for producing an oscillatory or reciprocatory motion of either or all of the blowpipes as well as the weld rod guides so that the flames from the blowpipes or the molten material from the weld rods may be distributed transversely of the groove between the plates to be united. This mechanism, which is best seen in Fig. 2, consists of a motor M and a speed reducing mechanism S adapted to impart reciprocatory motion to a sliding bar 27 through a link 35. Guides 28 confine and direct the movement of the sliding bar 27. As shown in Fig. 3, a yoke 29 may be secured to the underside of the sliding bar 27 and is provided with a sliding nut 31 which connects with and engages a slot 32 in a link 33. One end of the link 33 is secured in any convenient manner to a blowpipe mount 34 which will permit the blowpipe 22 to pivot about its own axis. It will be noticed that, as the sliding bar 27 is reciprocated by the motor M, the link 33 will cause the blowpipe 22 to pivot about its axis as a result of the engagement of the link 33 with the sliding nut 31. It will also be noticed by reference to Fig. 3, that the nearer the sliding nut 31 is positioned to the blowpipe 22 the greater the arc through which the blowpipe will pivot. Any other suitable means may be employed for oscillating the blowpipes. Similar mechanism may be provided to produce motion of any or all of the other elements of the weld unit C or weld unit D in a direction transverse of the groove. The welding unit D is similar in every respect to welding unit C, with the possible exception that the blowpipe, weld rod guide, weld rod, and weld rod preheating blowpipe are all somewhat larger to accommodate a larger weld rod 36 more fully adapted to complete the weld at the upper or larger portion of the groove. The various adjustments, and connections to the mechanism for producing oscillatory or transverse reciprocatory motion are identical with that which may be provided for the welding unit C.

A heat treating blowpipe G, illustrated by broken lines in Fig. 1, may be adjustably mounted to the frame F at the right of the welding unit D. The blowpipe G as well as the preheating unit E, although highly desirable, are not necessary to the complete function of the apparatus, and either or both may be omitted without affecting the scope of the invention. A gas supply connection T, mounted in any convenient manner on the frame F, supplies combustible gas to the several blowpipes. Any or all of the blowpipes are preferably cooled with any suitable circulating cooling medium, such as water, connections for which are shown in the drawings. An insulating sheet 37 extends horizontally beneath the top of the frame F, spaced from the top of the mounting plate 23 and shields the blowpipe mounting means from exposure to the several blowpipe flames.

In operation, a plate structure, preferably having been shaped and preliminarily united by one of the methods illustrated in Figs. 4, 5, or 8, is inverted and placed in the position shown in Fig. 3, with the welding rods 24 and 36 as well as the respective blowpipes properly positioned and aligned with respect to the groove between the contiguous surfaces of the plates. The feeding mechanism H is set in motion so that the rollers 39 turn in a clockwise direction, as indicated in Fig. 1, and the metal members or plates P and P' are propelled slowly in a rightward direction, as indicated by the arrow. The groove is first exposed to the action of the preheating unit E which heats the surfaces of the groove and the metal adjoining the groove to a high temperature, whereupon the feeding mechanism next presents the heated portions to the action of the oscillating blowpipe 22 which raises the surfaces of the groove to the welding temperature. Simultaneously a portion of the first weld rod 24, preferably previously heated by the weld rod preheating blowpipe 25, is also exposed to a flame issuing from the jet 41 of the blowpipe 22, causing it to melt and fuse with the surfaces at the lower part of the groove to form a homogeneous union therewith. As the molten puddle in the groove continues in its movement, solidification sets in, so that when it arrives at the second welding unit D, the previously deposited metal may have cooled to a point just below the lower critical temperature of the metal. It is sometimes desirable, however, to have the speed of the feeding mechanism and/or the spacing of the welding units adjusted so that the previously deposited metal is either in a semi-solid or in a solid condition at a temperature above the lower critical range. The blowpipe 42 of the welding unit D is preferably of greater capacity and is positioned higher than blowpipe 22 so that its flames may be applied to and cover the upper wider portion of the groove and the first layer of weld metal. The action of the welding unit D is substantially identical with that of welding unit C with the exception that a greater amount of material is deposited. As the second layer is added in a molten condition, the first deposited layer, in close contact therewith, undergoes a heat treatment if it has cooled below the critical temperature. As many welding units in a single machine as desired may be used, the number employed being somewhat dependent upon the thickness of the plate to be welded. Each deposited layer that may have cooled below the critical temperature is heat treated while depositing the subsequent layer. It is thus apparent that unless special provision is made the last-deposited layer may be left in a stressed condition. If this should be considered to be undesirable, a blowpipe G, indicated in Fig. 1, may be added to anneal, temper, or otherwise heat treat the last-deposited layer. Obviously, if each subsequent layer is deposited before the previously deposited layer has cooled below the critical temperature, the grain structure of the entire weld will be uniform so that the blowpipe G may not be necessary unless it is desired to heat treat the entire weld.

While high-temperature gas flames are preferably employed as the heating and welding means, especially in depositing the main multiple-layer weld, it will be obvious that electric welding, e. g., metallic electrode electric arc welding, may be utilized in some instances in producing the preliminary weld or the main weld or both; and a combination of electric and gas welding means may also be employed. The structure, shown in Figs. 1, 2 and 3, of the drawings is illustrative merely of one form of apparatus which may be used to perform the new method, and it will be evident that numerous changes may be made in this apparatus without departing from the principles of this invention or sacrificing any of its advantages.

We claim:

1. A process of welding together contiguous surfaces of relatively thick steel plates with a weld having substantially uniform grain structure, which comprises depositing a plurality of layers of weld metal in superposed relation between said surfaces during a single pass of a gas welding means and said surfaces relatively to one another lengthwise of said surfaces, each consecutive layer being deposited after the last prior deposited layer has solidified but before it has cooled below the critical temperature.

2. A process of butt welding relatively thick metal members or plates during a single pass of said members relatively to the welding means, to produce a multiple layer weld having a substantially uniform grain structure which comprises assembling scarfed edges of said members in opposed relation to provide a welding groove; applying welding heat from high temperature oxy-fuel gas flames progressively along the surfaces of said groove and to a welding rod to melt the latter and deposit a layer of weld metal along the bottom of said groove; and, after said layer has cooled to a temperature between its melting point and just below the lower critical temperature, concurrently applying welding heat from high temperature oxy-fuel gas flames progressively along the surfaces of said groove, to the top surface of the deposited layer, and to a second welding rod to melt the latter and deposit a layer of weld metal in said groove and upon the previously-deposited layer of weld metal, both of said layers having a substantially uniform grain structure.

3. A process of butt welding relatively thick metal members or plates as claimed in claim 2, in which said plates and the surfaces of said groove are preheated by application of excess-acetylene oxyacetylene flame prior to the application of the first welding heat and the first molten weld metal.

4. A process of butt welding relatively thick metal members or plates as claimed in claim 2, in which said plates and the surfaces of said groove are preheated by application of excess-acetylene oxyacetylene flame prior to the application of the first welding heat and the first molten weld metal, and in which the time between the application of the first welding heat and the application of the second welding heat is sufficiently short to maintain the surfaces of the groove and the previously-deposited layer of weld metal at a sufficiently high temperature to render unnecessary a preheating of these surfaces.

5. A process of butt welding relatively thick metal members or plates as claimed in claim 2, in which the high-temperature oxy-fuel-gas flames are moved back and forth across said groove while the welding progresses along the latter.

6. A process of butt welding relatively thick metal members or plates as claimed in claim 2, in which the high-temperature oxy-fuel-gas flames are moved back and forth across said groove while the welding progresses along the latter, the transverse movement of the second welding flame being greater than that of the first welding flame.

7. A process of butt welding relatively thick metal members or plates as claimed in claim 2, the melting portions of said welding rods being moved back and forth across said groove while the welding progresses along the latter.

8. A process of butt welding relatively thick metal members or plates as claimed in claim 2, in which the cross sectional area of the second welding rod is greater than that of the first welding rod.

9. A process of butt welding relatively thick metal plates, which comprises assembling scarfed edges of said plates in opposed relation to provide a welding groove which is wider at its top than at its bottom; positioning this assembly with the narrower side of the groove uppermost; preliminarily welding said plates together by a continuous weld extending lengthwise of and into the uppermost portion of said groove; inverting this preliminarily welded plate structure; preheating the scarf and preliminary weld with an excess-acetylene oxyacetylene flame; applying welding heat from high temperature oxy-fuel gas flames progressively along the groove surfaces then uppermost and to a welding rod to melt the latter and deposit a layer of weld metal along the bottom of such hot preheated groove and onto the preliminary weld; and concurrently applying welding heat from high temperature oxy-fuel gas flames progressively along the remaining surfaces of such groove, to the top surface of such deposited layer, and to a second welding rod to melt the latter and deposit a second layer of weld metal in such groove and upon the still hot previously-deposited layer of weld metal.

10. Welding apparatus for producing in a single pass a multiple layer weld having a substantially uniform grain structure, said apparatus comprising a support; gas welding units mounted thereon in aligned and spaced relation along and above the line of weld on the work and operative to deposit a plurality of successive layers of weld metal along said line, each layer after the first, overlying and completely covering the preceding layer; and mechanism for effecting relative movement between said work and said units and support lengthwise of said line at a rate only sufficient to permit each layer to solidify and to cool no further than to just below the lower critical temperature before the next succeeding layer is deposited; each unit comprising a welding rod guide and a welding torch adapted to apply welding heat to the work at the line of weld and to the adjoining portion of a metal welding rod fed through said guide, and to melt said rod and deposit a layer of weld metal.

11. Welding apparatus as defined in claim 10, such apparatus also including mechanism for producing reciprocating movement of at least one of the welding torches in a direction transverse to the line of the weld.

12. Welding apparatus as defined in claim 10, such apparatus also including mechanism for producing reciprocating movement of each welding torch in a direction transverse to the line of the weld, and means for controlling the amplitude of such reciprocating movement.

13. A process of producing a fusion welded butt joint between contiguous scarfed steel plates thicker than 0.75 inch, the metal of such joint being sound, continuous for the full thickness of the plates, and having a substantially uniform metallographic structure, comprising preheating the scarf with an excess-acetylene oxyacetylene flame; preheating a plurality of steel welding rods; melting the hot preheated welding rods, and depositing the so melted steel as a plurality of successive layers upon the hot preheated scarf; each of such layers, after the first, being deposited before the preceding layer has cooled further than to just below the lower critical temperature of the steel; and, subsequently but before any of the deposited metal has cooled further than just below the lower critical temperature of the steel, normalizing at least the last-deposited layer of weld metal.

14. A process of producing a fusion welded butt joint between contiguous scarfed steel plates thicker than 0.75 inch, the metal of such joint being sound, continuous for the full thickness of the plates, and having a substantially uniform metallographic structure, comprising preheating the scarf with an excess-acetylene oxyacetylene flame; preheating a plurality of steel welding rods; melting the hot preheated welding rods, and depositing the so melted steel as a plurality of successive layers upon the hot preheated scarf, under an excess-acetylene oxyacetylene flame; each of such layers, after the first, being deposited after the preceding layer has at least partially solidified but before such preceding layer has cooled further than to just below the lower critical temperature of the steel; and, subsequently but before any of the deposited metal has cooled further than just below the lower critical temperature of the steel, normalizing at least the last-deposited layer of weld metal.

15. A gas welding process for producing, in a single pass lengthwise of contiguous scarfed edges of relatively thick steel plates, a unitary thick butt weld formed of successively deposited layers of weld metal, integrally united to one another and to said edges, said process comprising progressively applying a high temperature gas flame against and along said edges, melting a welding rod in a gas flame and depositing the metal so melted along and between such heated edges, to form one layer; and, after such layer has solidified but before it has cooled further than to just below the lower critical temperature of the steel, progressively applying a second high temperature gas flame against and along hot portions of the previously-heated edges and against and along the hot previously-deposited layer while melting a second welding rod, of greater size than the first rod, in said second flame and depositing the molten metal from said second rod along such heated edge portions and onto the heated previously-deposited layer to form a second layer integrally united with the previously-deposited layer and said edge portions.

16. Gas welding apparatus for producing, in a single pass lengthwise of contiguous scarfed edges of relatively thick steel plates, a unitary, thick butt weld formed of successively deposited superposed layers of weld metal integrally united to one another and to said edges, said apparatus comprising a support; gas welding units mounted thereon in aligned and spaced relation along and above said contiguous edges and operative to deposit a plurality of layers of weld metal simultaneously along said edges, each layer after the first overlying and completely covering the preceding layer; and mechanism for effecting relative movement between said plates and said support and units lengthwise of said contiguous edges at a rate only sufficient to permit each layer to solidify and to cool no further than to just below the lower critical temperature before the next succeeding layer is deposited; each of said units comprising a welding rod guide and a welding torch, the torch of the first unit being adapted to apply a gaseous preheating and welding flame against and along said edges and against a metal welding rod fed through the guide of the first unit to heat an extended length of said edges and to melt rod metal and deposit a layer of weld metal along said heated edges, the torch of each succeeding welding unit being adapted to apply a gaseous heating flame against and along portions of said edges and a portion of the previously-deposited layer of weld metal and severally against the welding rods fed through the guides associated with the succeeding torches, to heat extended lengths of such edge portions and such deposited layers and to melt additional rod metal and deposit the same upon the previously-deposited layer.

ARTHUR R. LYTLE.
WILLIAM MORTON.

CERTIFICATE OF CORRECTION.

Patent No. 2,158,664.      May 16, 1939.

ARTHUR R. LYTLE, ET AL.

It is hereby certified that error appears in the printed specification of the above numbered patent requiring correction as follows: Page 4, second column, lines 48, 49 and 50, strike out the comma and words ", both of said layers having a substantially uniform grain structure"; and that the said Letters Patent should be read with this correction therein that the same may conform to the record of the case in the Patent Office.

Signed and sealed this 11th day of July, A. D. 1939.

Henry Van Arsdale (Seal)      Acting Commissioner of Patents.

first overlying and completely covering the preceding layer; and mechanism for effecting relative movement between said plates and said support and units lengthwise of said contiguous edges at a rate only sufficient to permit each layer to solidify and to cool no further than to just below the lower critical temperature before the next succeeding layer is deposited; each of said units comprising a welding rod guide and a welding torch, the torch of the first unit being adapted to apply a gaseous preheating and welding flame against and along said edges and against a metal welding rod fed through the guide of the first unit to heat an extended length of said edges and to melt rod metal and deposit a layer of weld metal along said heated edges, the torch of each succeeding welding unit being adapted to apply a gaseous heating flame against and along portions of said edges and a portion of the previously-deposited layer of weld metal and severally against the welding rods fed through the guides associated with the succeeding torches, to heat extended lengths of such edge portions and such deposited layers and to melt additional rod metal and deposit the same upon the previously-deposited layer.

ARTHUR R. LYTLE.
WILLIAM MORTON.

CERTIFICATE OF CORRECTION.

Patent No. 2,158,664.  May 16, 1939.

ARTHUR R. LYTLE, ET AL.

It is hereby certified that error appears in the printed specification of the above numbered patent requiring correction as follows: Page 4, second column, lines 48, 49 and 50, strike out the comma and words ", both of said layers having a substantially uniform grain structure"; and that the said Letters Patent should be read with this correction therein that the same may conform to the record of the case in the Patent Office.

Signed and sealed this 11th day of July, A. D. 1939.

Henry Van Arsdale (Seal) Acting Commissioner of Patents.